(12) United States Patent
Heo

(10) Patent No.: US 12,443,062 B2
(45) Date of Patent: Oct. 14, 2025

(54) DISPLAY DEVICE COMPRISING A COLOR LAYER HAVING A FIRST SUB-COLOR LAYER DISPOSED UNDER A WINDOW LAYER AND A SECOND SUB-COLOR LAYER DISPOSED UNDER THE FIRST SUB-COLOR LAYER

(71) Applicant: Samsung Display Co., Ltd., Yongin-si (KR)

(72) Inventor: Sejun Heo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/050,681

(22) Filed: Oct. 28, 2022

(65) Prior Publication Data

US 2023/0107293 A1    Apr. 6, 2023

Related U.S. Application Data

(62) Division of application No. 16/560,704, filed on Sep. 4, 2019, now Pat. No. 11,513,382.

(30) Foreign Application Priority Data

Nov. 16, 2018   (KR) .................. 10-2018-0141250

(51) Int. Cl.
  *G02F 1/1333* (2006.01)
  *G02F 1/1335* (2006.01)

(52) U.S. Cl.
  CPC .. *G02F 1/133308* (2013.01); *G02F 1/133331* (2021.01); *G02F 1/133512* (2013.01); *G02F 2201/50* (2013.01); *G02F 2202/28* (2013.01)

(58) Field of Classification Search
  None
  See application file for complete search history.

(56) References Cited

U.S. PATENT DOCUMENTS

| | | |
|---|---|---|
| 9,929,128 B1 | 3/2018 | Cheng et al. |
| 10,018,778 B2 | 7/2018 | Kim |
| 10,181,576 B2 | 1/2019 | Chung et al. |
| 10,643,503 B2 | 5/2020 | Mao |
| 2010/0098839 A1 | 4/2010 | Toyoda et al. |

(Continued)

FOREIGN PATENT DOCUMENTS

| | | |
|---|---|---|
| CN | 103713768 A | 4/2014 |
| CN | 206134170 U | 4/2017 |

(Continued)

OTHER PUBLICATIONS

Chinese Office Action dated Dec. 15, 2022 issued in corresponding Chinese Application No. 201911111754.3 (7 pages).

(Continued)

*Primary Examiner* — Paul C Lee
(74) *Attorney, Agent, or Firm* — Womble Bond Dickinson (US) LLP

(57) ABSTRACT

Provided is a display device including a window layer including a transmission area and a bezel area adjacent to the transmission area, a color layer under the bezel area, an adhesive layer under the transmission area, and a display panel under the adhesive layer, wherein the color layer and the adhesive layer may not overlap in a direction perpendicular to the transmission area.

7 Claims, 9 Drawing Sheets

(56) References Cited

U.S. PATENT DOCUMENTS

| | | |
|---|---|---|
| 2012/0075838 A1 | 3/2012 | Lee et al. |
| 2012/0106201 A1* | 5/2012 | Choi ................ H04M 1/0202 361/679.01 |
| 2013/0057485 A1* | 3/2013 | Lim ................ G02F 1/133512 345/32 |
| 2013/0094160 A1* | 4/2013 | Narumi ............ G02F 1/133308 361/752 |
| 2013/0321293 A1* | 12/2013 | Park ................ G02F 1/13338 345/173 |
| 2014/0176849 A1* | 6/2014 | Lee ................ G02F 1/133308 349/58 |
| 2014/0335316 A1 | 11/2014 | Fukushima et al. |
| 2015/0153776 A1 | 6/2015 | Cheng et al. |
| 2015/0253615 A1* | 9/2015 | Ryu ................ G02F 1/133602 445/24 |
| 2017/0184911 A1* | 6/2017 | Ochi ................ G02F 1/133308 |
| 2017/0285819 A1 | 10/2017 | Li et al. |
| 2017/0352692 A1 | 12/2017 | Lee et al. |
| 2018/0062111 A1 | 3/2018 | Kim |
| 2020/0130057 A1 | 4/2020 | Zhi et al. |

FOREIGN PATENT DOCUMENTS

| | | |
|---|---|---|
| CN | 106782094 A | 5/2017 |
| CN | 107545848 A | 1/2018 |
| CN | 107819008 A | 3/2018 |
| CN | 108795304 A | 11/2018 |
| JP | 2007-138013 A | 6/2007 |
| JP | 2007-280620 A | 10/2007 |
| JP | 2008-103700 A | 5/2008 |
| KR | 10-0945381 B1 | 3/2010 |
| KR | 10-2013-0025520 A | 3/2013 |
| KR | 10-2014-0043608 | 4/2014 |
| KR | 10-2014-0102606 A | 8/2014 |
| KR | 10-1736986 B1 | 5/2017 |
| KR | 10-2017-0078480 A | 7/2017 |
| KR | 10-2017-0125289 A | 11/2017 |
| KR | 10-1832326 B1 | 2/2018 |
| KR | 10-2018-0079466 A | 7/2018 |

OTHER PUBLICATIONS

Notice of Allowance dated Mar. 5, 2025, issued in corresponding Korean Patent Application No. 10-2018-0141250 (2 pages).

* cited by examiner

DISPLAY DEVICE COMPRISING A COLOR LAYER HAVING A FIRST SUB-COLOR LAYER DISPOSED UNDER A WINDOW LAYER AND A SECOND SUB-COLOR LAYER DISPOSED UNDER THE FIRST SUB-COLOR LAYER

CROSS-REFERENCE TO RELATED APPLICATIONS

This application is a divisional of U.S. patent application Ser. No. 16/560,704, filed on Sep. 4, 2019, and claims priority to and the benefit of Korean Patent Application No. 10-2018-0141250, filed on Nov. 16, 2018, the entire contents of each of which are hereby incorporated by reference.

BACKGROUND

The present disclosure herein relates to a display device having improved reliability.

A display device may include a window layer, a color layer, an adhesive layer, and a display panel. The window layer and the color layer may be bonded to the display panel by the adhesive layer. The thickness of the color layer may become relatively large in order to realize various colors. The adhesive layer may not sufficiently cover the thick color layer. Due to the thick color layer, an air bubble may be generated to result in defect.

SUMMARY

The present disclosure provides a display device with improved reliability.

An embodiment of the inventive concept provides a display device including: a window layer including a transmission area and a bezel area adjacent to the transmission area; a color layer under the bezel area; an adhesive layer under the transmission area; and a display panel under the adhesive layer, wherein the color layer and the adhesive layer do not overlap in a direction perpendicular to the transmission area.

In an embodiment, the display panel may include a display area and a non-display area adjacent to the display area, the adhesive layer may overlap the display area in a direction perpendicular to the transmission area, and the color layer may overlap the non-display area.

In an embodiment, the shape of the adhesive layer may correspond to that of the display area on a plane.

In an embodiment, a boundary between the display area and the non-display area may overlap an exterior boundary of the adhesive layer on a plane.

In an embodiment, an exterior boundary of the adhesive layer may be around a boundary of the display area and the non-display area.

In an embodiment, the color layer may be separated from the display area by 0.3 mm or greater.

In an embodiment, the color layer may include a plurality of sub-color layers.

In an embodiment, a color of the plurality of sub-color layers may be white.

In an embodiment, the plurality of sub-color layers may include a first sub-color layer under a window layer, and a second sub-color layer under the first sub-color layer, wherein a width of the first sub-color layer is greater than that of the second sub-color layer.

In an embodiment, the display device may further include a shield layer under the color layer.

In an embodiment, the width of the shield layer may be smaller than that of the color layer.

In an embodiment, the thickness of the adhesive layer may be greater than that of the color layer.

In an embodiment, the adhesive layer may have the shape in which a part corresponding to a corner of a quadrangle has a curvature.

In an embodiments of the inventive concept, a display device includes: a window layer; a color layer under the window layer; an adhesive layer under the window layer; and a display panel under the adhesive layer and including a display area and a non-display area adjacent to the display area, wherein, in a direction perpendicular to the display panel, the shape of the adhesive layer corresponds to that of the display area.

In an embodiment, a boundary between the display area and the non-display area may overlap an exterior boundary of the adhesive layer in a direction perpendicular to the display panel.

In an embodiment, an exterior boundary of the adhesive layer may be around a boundary between the display area and the non-display area on a plane.

In an embodiment, the color layer may be separated from the display area by 0.3 mm or greater in a direction perpendicular to the display panel.

In an embodiment, the color layer may include a plurality of sub-color layers.

In an embodiment, the display device may further include a shield layer under the color layer.

In an embodiment, the adhesive layer may have the shape in which a part corresponding to a corner of a quadrangle has a curvature in a direction perpendicular to the display panel.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
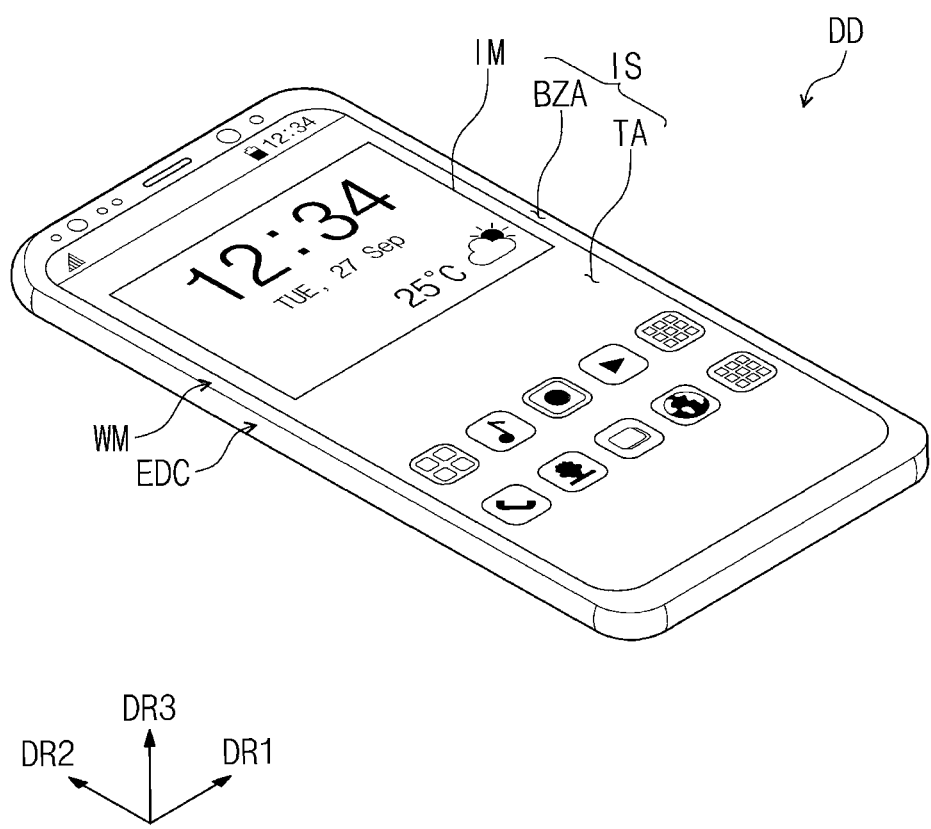
FIG. 1 is a perspective view of a display device according to an embodiment of the inventive concept.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The display device may include various other relevant devices or components. For example, a display device may include a window layer, an adhesive layer, a display module, an electronic module, a power supply module, a bracket, and an external case. According to embodiments of the present invention described herein, the display device may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
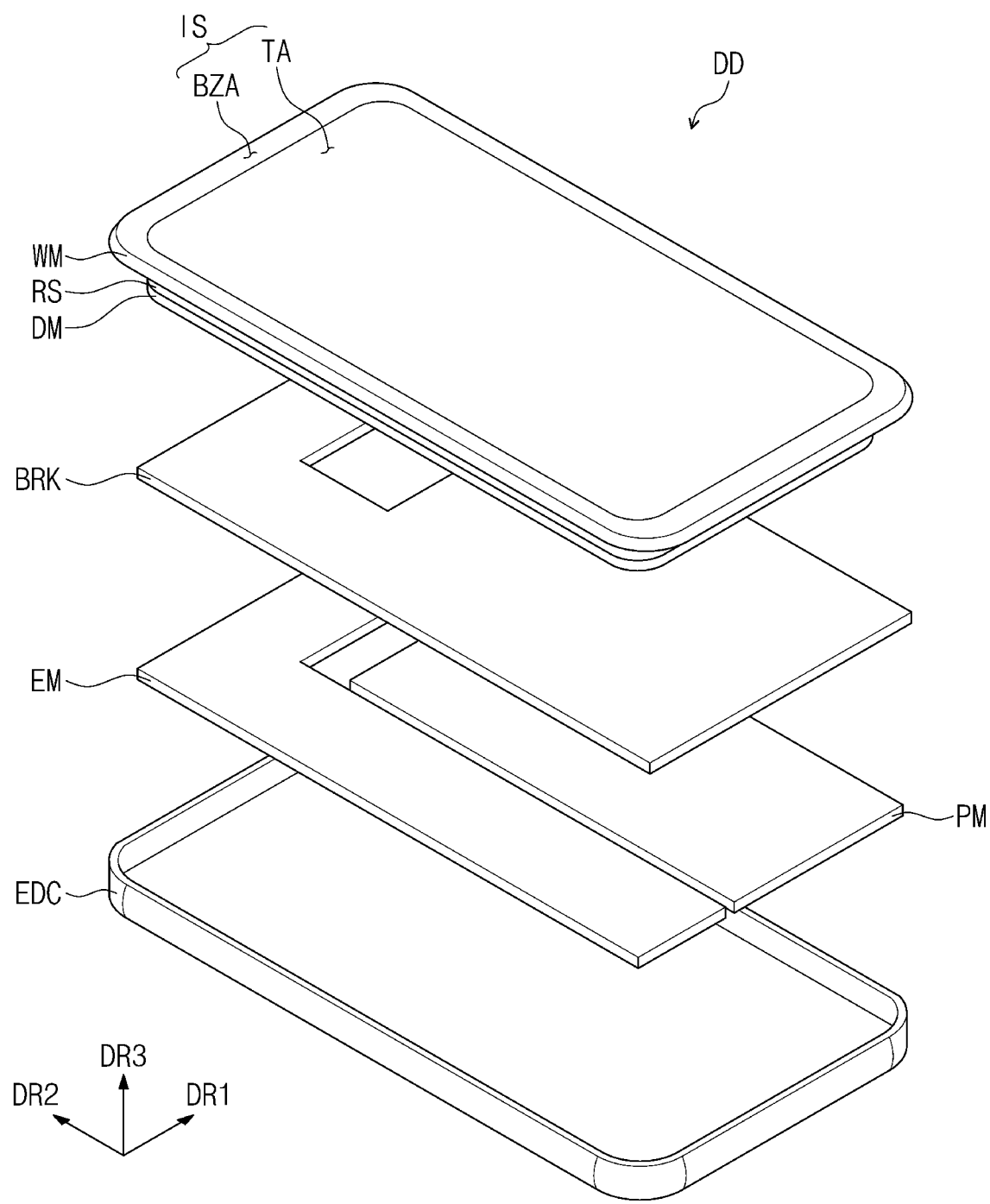
FIG. 2 is an exploded perspective view of a display device according to an embodiment of the inventive concept.

FIG. 1 is a perspective view of a display device according to an embodiment of the inventive concept, and FIG. 2 is an exploded perspective view of a display device according to an embodiment of the inventive concept.

Referring to FIGS. 1 and 2, a display device DD may be a device activated according to an electrical signal. The display device DD may include various embodiments. For example, the display device DD may be used in a large electronic device such as a television, a monitor, or a billboard, and also used in a small or medium electronic device such as a cellular phone, a smart-phone, a personal computer, a notebook computer, a personal digital assistant, a car navigation unit, a game console, a portable electronic device, or a camera. In addition, these are presented only as example embodiments, and the display device DD may also be employed in other electronic devices without being deviated from the inventive concept. In the present embodiment, the display device DD is exemplarily illustrated as a smart-phone.

The display device DD may display an image IM on a display surface IS which is parallel to a first direction DR1 and a second direction DR2, towards a third direction DR3. The display surface IS on which the image IM is displayed may correspond to a front surface of the display device DD and correspond to a front surface of the window layer WM. Hereinafter, the display surface IS and the front surface of the display device DD, and the front surface of the window layer WM may be the same surface. The image IM may include not only a moving image (e.g., video), but also a still image. In FIG. 1, as an example of the image IM, a clock window, and icons are illustrated.

In the present embodiment, on the basis of a direction in which the image IM is displayed, a front surface (or an upper surface) and a rear surface (or a lower surface) may be defined. The front surface and the rear surface are opposite each other in the third direction DR3, and normal directions of the front surface and the rear surface may be parallel to the third direction DR3.

On the other hand, directions indicated by the first to third directions DR1, DR2, and DR3 are relative concepts, and may be changed to other directions. Hereinafter, the first to third directions are directions respectively illustrated by the first to third directions DR1, DR2, and DR3. In addition, in the present embodiment, a surface defined by the first direction DR1 and the second direction DR2 may be referred to as a plane, and "being viewed on a plane" may be referred to as being viewed in the third direction DR3 (e.g., viewing perpendicularly from the plane defined by the first direction DR1 and the second direction DR2).

The front surface of the display device DD may be divided into a transmission area TA and a bezel area BZA. The front surface of the display device DD may be substantially defined by the front surface IS of the window layer WM. The window layer WM may include the transmission area TA and the bezel area BZA. Hereinafter, the front surface IS of the display device DD and the front surface IS of the window layer WM will be described with a like reference character.

The transmission area TA is illustrated in the shape in which a part corresponding to a corner (e.g., an apex) of the quadrangle has a curvature on a plane (e.g., the transmission area TA may have a rectangular shape with rounded corners). However, this is only an example, and the transmission area TA may have various shapes and is not limited to any one embodiment.

The display device DD may include a window layer WM, an adhesive layer RS, a display module DM, an electronic module EM, a power supply module PM, a bracket BRK, and an external case EDC.

The window layer WM may provide the appearance of the display device DD. The window layer WM may protect internal components of the display device DD from an external shock and substantially provide the display surface IS of the display device DD. For example, the window layer WM may include a glass substrate, a sapphire substrate, or a plastic film. The window layer WM may have a multi-layered or a single-layered structure. For example, the window layer WM may have a laminated structure of a plurality of plastic films bonded by an adhesive, or a laminated structure of a glass substrate and a plastic film bonded by an adhesive.

The window layer WM may have the shape in which a part corresponding to a corner (e.g., an apex) of the quadrangle has a curvature when viewed on a plane. However, this is only an example, and the window layer WM may have various shapes and is not limited to any one embodiment.

The adhesive layer RS may be disposed under the window layer WM. The display module DM and the window layer WM may be bonded by the adhesive layer RS. The adhesive layer RS may include a typical adhesive, a pressure adhesive, or any other suitable adhesive as would be understood by one skilled in the art. For example, the adhesive layer RS may be an Optically Clear Adhesive film, an Optically Clear Resin, or a Pressure Sensitive Adhesive film.

The display module DM may be electrically connected to the electronic module EM through a flexible circuit board. The display panel DP (e.g., see FIG. 3) may receive information on an image IM to be displayed through the electronic module EM.

The power supply module PM supplies power necessary for general operations of the display device DD. The power supply module PM may include a battery module (e.g., a typical battery module).

The bracket BRK divides the internal space of the display device DD. The bracket BRK defines a space in which other components may be disposed. The bracket BRK may include a metal member, a plastic member, or any other suitable member as would be understood by those skilled in the art. In FIG. 2, one bracket BRK is exemplarily illustrated, but the display device DD may include a plurality of brackets.

In the present embodiment, the external case EDC provides the appearance of the display device DD together with the window layer WM. In this embodiment, the external case EDC having one body is exemplarily illustrated, but the external case EDC may include a plurality of bodies that are put together. The external case EDC may include a plurality of frames and/or plates provided with glass, plastic, or metal.

The electronic module EM may include various functional modules that are mounted in a mother board and operate the display device DD. The mother board may include a printed circuit board of a rigid type or a flexible type. The electronic module EM may include a control module, a wireless communication module, an image input module, a sound input module, a sound output module, a memory, an external interface, a light emitting module, a light receiving module, and a camera module, etc. Some of the functional modules may not be mounted on the mother board, and may be electrically connected to a flexible circuit board.

Figure 3:
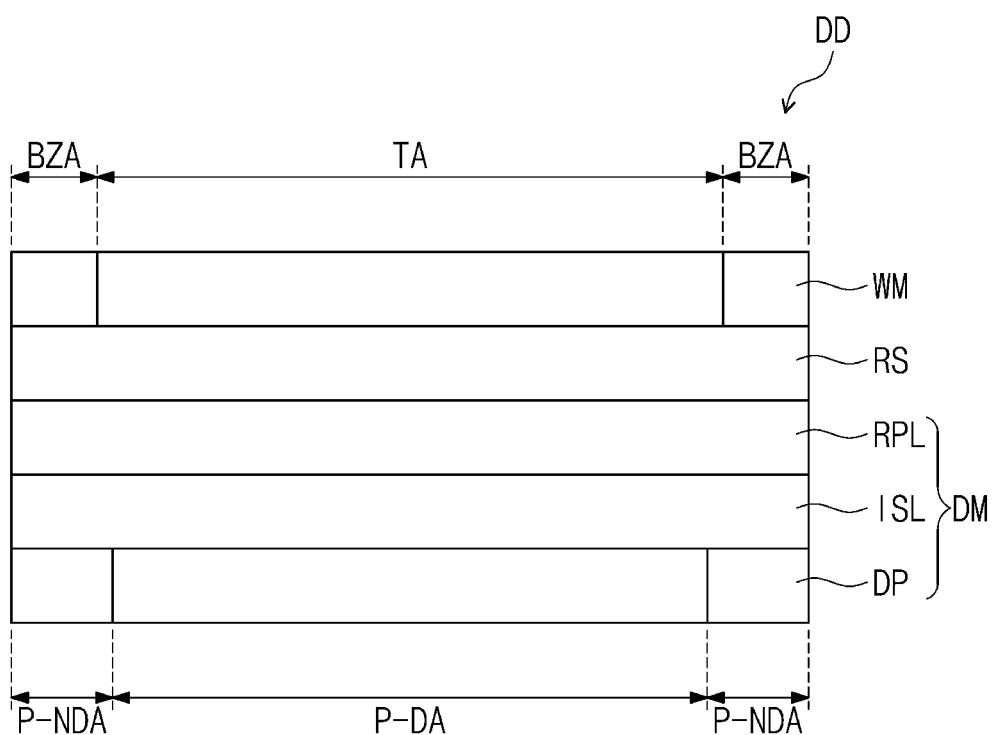
FIG. 3 is a cross-sectional view of a display device according to an embodiment of the inventive concept.

FIG. 3 is a cross-sectional view of a display device according to an embodiment of the inventive concept. Like reference numerals are given to the elements described in relation to FIGS. 1 and 2, and descriptions thereabout may be omitted.

In relation to FIG. 3, the display device DD may include a window layer WM, an adhesive layer RS, and a display module DM.

The display module DM may be disposed under the adhesive layer RS. The display module DM may include a reflection prevention layer RPL, an input sensing layer ISL, and a display panel DP.

The reflection prevention layer RPL may reduce a reflection ratio of external light incident from an upper side of the window layer WM (e.g., light from outside of the display device). The reflection prevention layer RPL according to an embodiment of the inventive concept may include a retarder and a polarizer. The retarder may have a film type or a liquid crystal coating type, and include a $\lambda/2$ retarder and/or a $\lambda/4$ retarder. The polarizer may also have a film type or a liquid crystal coating type. The film type may include a stretched synthetic resin film, and the liquid crystal coating type may include liquid crystals arranged in an array (e.g., a prescribed array). The retarder and the polarizer may further include a protection film. The retarder and the polarizer themselves or the protection film may be defined as a base layer of the reflection prevention layer RPL.

The reflection prevention layer RPL may include color filters. The color filters may also be arranged in an array (e.g., have a prescribed array). The array of color filters may be determined in consideration of light emitting colors of pixels included in the display panel DP. The reflection prevention layer RPL may further include a black matrix adjacent to the color filters.

The reflection prevention layer RPL may include a destructive interference structure. For example, the destructive interference structure may include a first reflection layer and a second reflection layer disposed on different layers. First reflection light and second reflection light respectively reflected by the first reflection layer and the second reflection layer may destructively interfere with each other, and, accordingly, a reflection ratio of the external light may be reduced.

The input sensing layer ISL may acquire coordinate information of an external input. For example, the input sensing layer ISL may be a capacitive touch sensor configured to sense an external input using mutual capacitance. However, this is an example, and the input sensing layer ISL may include various other suitable sensors as is well understood by those skilled in the art. The lamination order of the input sensing layer ISL and the reflection prevention layer RPL may be changed.

The display panel DP may include a display area P-DA on which the image IM (see FIG. 1) is displayed, and a non-display area P-NDA around (e.g., surrounding) the display area P-DA and on which the image IM is not displayed. The non-display area P-NDA may include a driving circuit and/or driving wirings for driving the display area P-DA.

The display panel DP may be a non-emissive display panel or an emissive display panel. The non-emissive display panel may be, for example, a liquid crystal display (LCD) panel. The emissive display panel may be, for example, an organic light emitting display (OLED) panel, a quantum dot light emitting display panel, or a microLED display panel. A light emitting layer of the organic light emitting display panel includes an organic light emitting material. A light emitting layer of the quantum dot light emitting display panel may include a quantum dot and a quantum rod. Hereinafter, the display panel DP will be described as the organic light emitting display panel.

Figure 4:
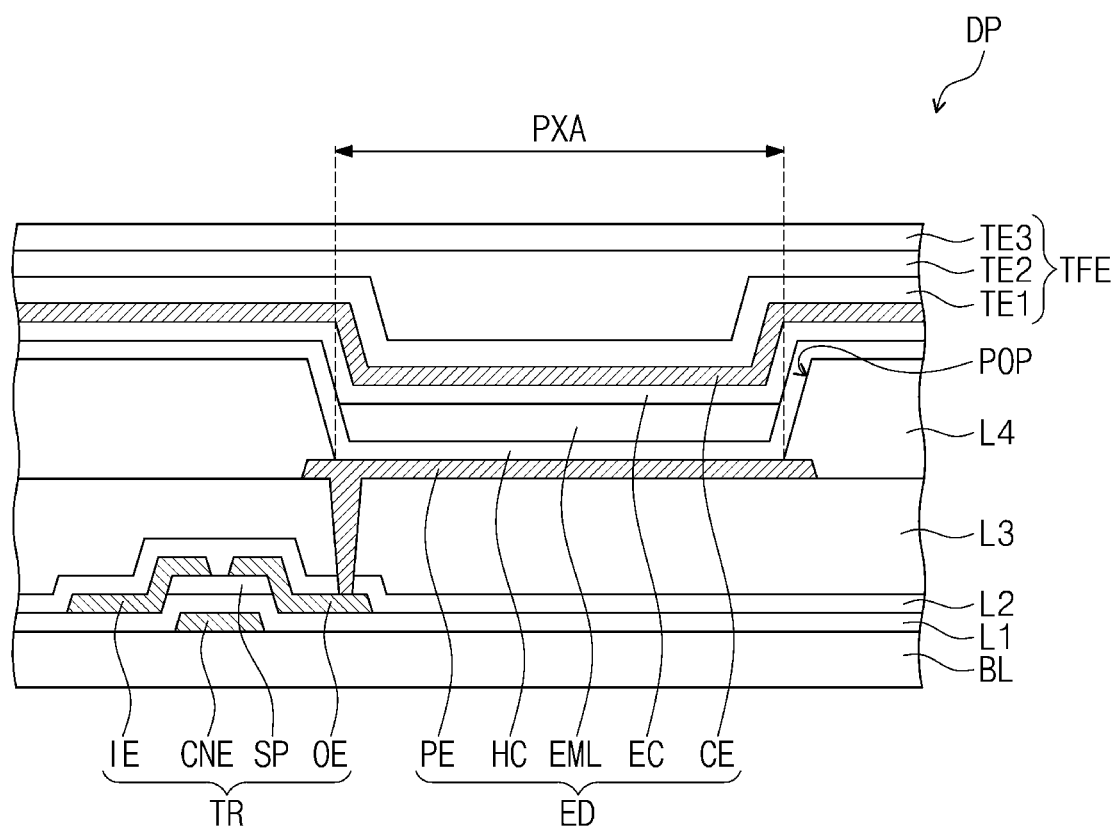
FIG. 4 is a cross-sectional view of an organic light emitting display panel according to an embodiment of the inventive concept.

FIG. 4 is a cross-sectional view of an organic light emitting display panel according to an embodiment of the inventive concept.

With reference to FIG. 4, the display panel DP may be an organic light emitting display panel. A base layer BL may have a silicon substrate, a plastic substrate, a glass substrate, an insulation film, or a laminated structure including a plurality of insulation layers. A thin film transistor TR may include a control electrode CNE, an input electrode IE, an output electrode OE and a semiconductor pattern SP. FIG. 4 exemplarily illustrates that the thin film transistor TR has a bottom-gate structure, but the structure of the thin-film transistor is not limited thereto. For example, the thin film transistor TR may have a top-gate structure.

The control electrode CNE may be disposed on the base layer BL. The control electrode CNE may include a conductive material. For example, the conductive material may be a metal material, and the metal material may include, for example, molybdenum, silver, titanium, copper, aluminum, an alloy thereof, or any other suitable conductive material as would be understood by those skilled in the art.

A first insulation layer L1 may be disposed on the base layer BL and cover the control electrode CNE. In other words, the control electrode CNE may be disposed between the first insulation layer L1 and the base layer BL.

A semiconductor pattern SP may be disposed on the first insulation layer L1. On the cross-section, the semiconductor pattern SP may be disposed separately from the control electrode CNE with the first insulation layer L1 interposed therebetween.

The semiconductor pattern SP may include a semiconductor material. The semiconductor material may include, for example, at least any one of an amorphous silicon, a polysilicon, a single crystal silicon, an oxide semiconductor, a compound semiconductor, or any other suitable semiconductor material as would be understood by those skilled in the art. The input electrode IE and the output electrode OE may be disposed on the semiconductor pattern SP.

The second insulation layer L2 may be disposed on the first insulation layer L1, and cover the semiconductor pattern SP, the input electrode IE and the output electrode OE. In other words, the semiconductor pattern SP, the input electrode IE and the output electrode OE may be disposed between the first insulation layer L1 and the second insulation layer L2.

A third insulation layer L3 may be disposed on the second insulation layer L2. For example, the first insulation layer L1 and the second insulation layer L2 may include an inorganic material, and the third insulation layer L3 may include an organic material. The third insulation layer L3 may provide a flat surface.

A light emitting element ED may include an organic light emitting diode. The light emitting element ED may include a pixel electrode PE, a first auxiliary layer HC (or a hole control layer), an emission layer EML, a second auxiliary layer EC (or an electron control layer), and a common electrode CE.

The pixel electrode PE may be disposed on the third insulation layer L3. A through-hole is provided in the second and third insulation layers L2 and L3, and a part of the output electrode OE may be exposed by the through-hole. The pixel electrode PE may be electrically connected to the exposed output electrode OE. For example, the pixel electrode PE may be an anode electrode.

A fourth insulation layer L4 may be disposed on the third insulation layer L3. The fourth insulation layer L4 may cover a part of the pixel electrode PE, and expose another part of the pixel electrode PE. The fourth insulation layer L4 may be a pixel definition layer. A pixel emission area PXA may be defined in correspondence to the pixel electrode PE exposed by the fourth insulation layer L4. An opening part (or an opening) POP, which defines the pixel emission area PXA, may be defined in the fourth insulation layer L4. A part of the fourth insulation layer L4 is removed to define the opening part POP. In the drawings, some of the lead lines corresponding to the reference characters of the opening part POP are pointing to side surfaces of a structure that defines the opening part.

The common electrode CE is disposed on the pixel electrode PE. The common electrode CE may be, for example, a cathode electrode. The common electrode CE may include a material having a low work function so as to facilitate the injection of electrons.

Each of the pixel electrode PE and the common electrode CE may have a single layer or multiple layers. The pixel electrode PE and the common electrode CE may include a conductive material. The conductive material may be a metal, an alloy, an electric conductive compound, or a mixture thereof. For example, the pixel electrode PE and the common electrode CE may include at least any one of indium zinc oxide (ISO), indium gallium oxide (IGO), indium zinc gallium oxide (IGZO), a mixture/compound thereof, molybdenum, silver, titanium, copper, aluminum, an alloy thereof, or any other suitable material as would be understood by those skilled in the art.

The emission layer EML may be disposed between the pixel electrode PE and the common electrode CE. The emission layer EML may have a single layer structure formed from a single material, a single layer structure formed from a plurality of different materials, or a multi-layer structure having a plurality of layers formed from a plurality of the same or different materials.

The emission layer EML may include an organic material. The organic material may include any suitable material (e.g., a typically used material) and is not particularly limited. For example, the emission layer EML may be formed from at least any one of materials for emitting red, green, or blue color light, and may include a fluorescent material or a phosphorescent material.

The first auxiliary layer HC is disposed between the pixel electrode PE and the emission layer EML. The first auxiliary layer HC may be an area passed by holes injected from the pixel electrode PE in order to reach the emission layer EML.

The first auxiliary layer HC may include at least any one of a hole injection layer, a hole transport layer, and a single layer having a hole injection function and a hole transport function together. The first auxiliary layer HC may be provided with at least any one of a hole injection material and a hole transport material.

The second auxiliary layer EC is disposed between the emission layer and the common electrode CE. The second auxiliary layer EC may be an area passed by electrons injected from the common electrode CE in order to reach the emission layer EML.

The second auxiliary layer EC may include at least any one of an electron injection layer, an electron transport layer, and a single layer having an electron injection function and an electron transport function together. The second auxiliary layer EC may be provided with at least any one of an electron injection material and an electron transport material.

A thin film encapsulation layer TFE may be disposed on the common electrode CE. The thin film encapsulation layer TFE may directly cover the common electrode CE. In another embodiment of the inventive concept, a capping layer may be further disposed to cover the common electrode CE between the thin film encapsulation layer TFE and the common electrode CE. In this case, the thin film encapsulation layer TFE may directly cover the capping layer. In another embodiment of the inventive concept, the thin film encapsulation layer TFE may be omitted.

The thin film encapsulation layer TFE may include a first inorganic layer TE1, an organic layer TE2, and a second inorganic layer TE3 that are sequentially laminated. The organic layer TE2 may be disposed between the first inorganic layer TE1 and the second inorganic layer TE3. The first inorganic layer TE1 and the second inorganic layer TE3 may be provided by depositing an inorganic material, and the organic layer TE2 may be provided by depositing, printing, or coating an organic material.

The first inorganic layer TE1 and the second inorganic layer TE3 protect the light emitting element ED from moisture and oxygen, and the organic layer TE2 may protect the light emitting element ED from a foreign material such as dust particles. The first inorganic layer TE1 and the second inorganic layer TE3 may include at least any one of silicon nitride, silicon oxynitride, silicon oxide, titanium oxide, and aluminum oxide. The organic layer TE2 may include a polymer, for example, an acrylic-based organic layer. However, this is just an example, and the inventive concept is not limited thereto.

FIG. 4 exemplarily illustrates that the thin film encapsulation layer TFE includes two inorganic layers and one organic layer, but the embodiment of the inventive concept is not limited thereto. For example, the thin film encapsulation layer TFE may include three inorganic layers and two organic layers. In this case, the thin film encapsulation layer TFE may have the structure in which the inorganic layers and the organic layers may be alternately laminated.

Figure 5A:
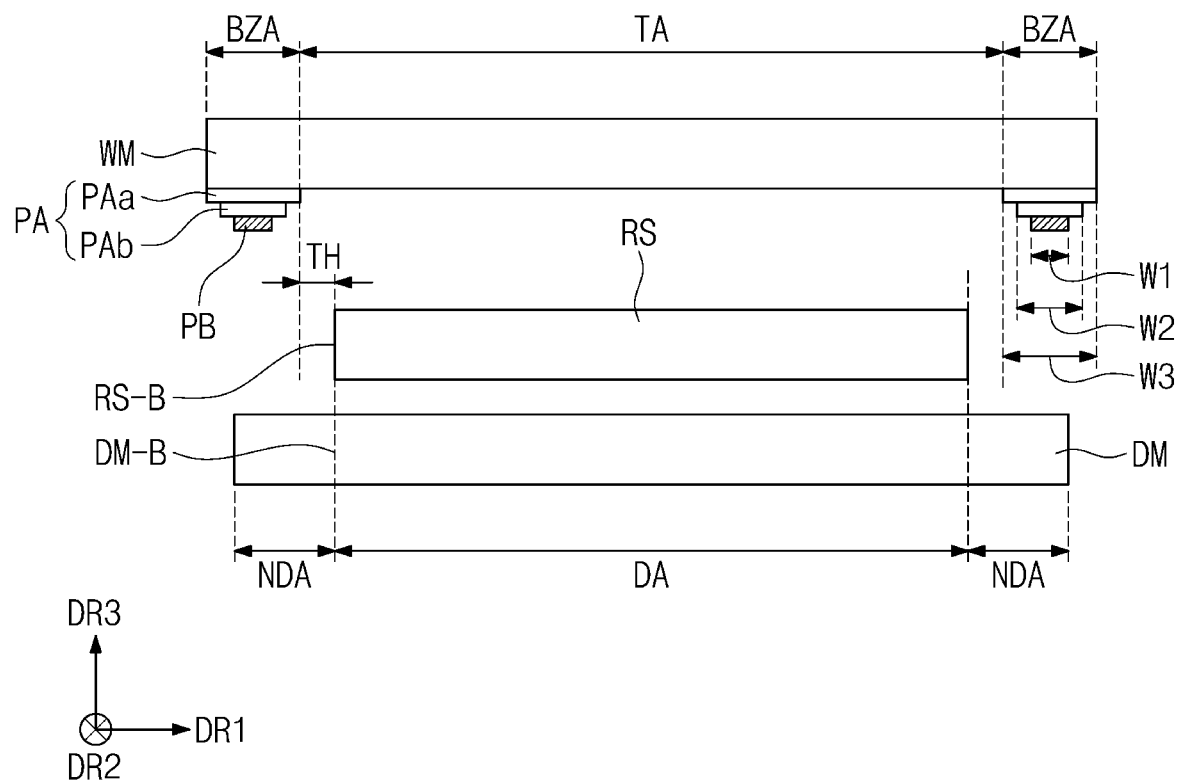
FIG. 5A is an exploded cross-sectional view of a display module according to an embodiment of the inventive concept.
Figure 5B:
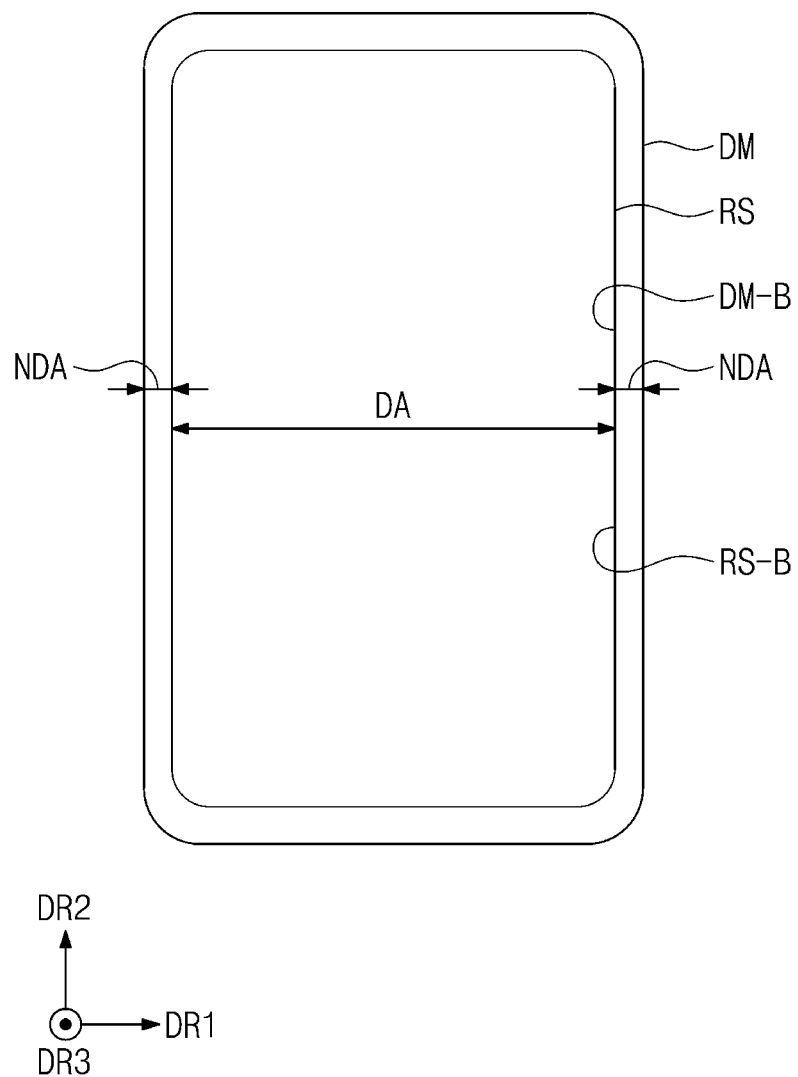
FIG. 5B is a plan view of a part of a display module according to an embodiment of the inventive concept.

FIG. 5A is an exploded cross-sectional view of a display module according to an embodiment of the inventive concept, and FIG. 5B is a plan view of a part of a display module according to an embodiment of the inventive concept.

Referring to FIG. 5A, the display module DM may include a window layer WM, a color layer PA, a shield layer PB, an adhesive layer RS, and a display module DM.

The window layer WM may include the transmission area TA and the bezel area BZA. A user may visually recognize an image IM through the transmission area TA.

The bezel area BZA is adjacent to the transmission area TA. The bezel area BZA may have a color (e.g., a prescribed color). The bezel area BZA may be around (e.g., may surround) the transmission area TA. Accordingly, the shape of the transmission area TA may be substantially defined by the bezel area BZA. However, this is just an example, and the bezel area BZA may be disposed adjacent only to one side of the transmission area TA or may be omitted in its entirety.

The color layer PA may be disposed under the window layer WM. For example, the bezel area BZA may be defined by the color layer PA. The color layer PA may be configured from a plurality of sub-color layers. The color layer PA may include a plurality of sub-color layers PAa and PAb. In an embodiment of the inventive concept, the color layer PA may include a first sub-color layer PAa and a second sub-color layer PAb. However, this is just an example, and the number of sub-color layers PAa and PAb in the inventive concept is not limited to the number of layers as illustrated, and may be smaller or larger. The width W3 in the first direction DR1 of the first sub-color layer PAa may be larger than the width W2 in the first direction DR1 of the second sub-color layer PAb.

The bezel area BZA may have any color (e.g., a prescribed color) based on the color of the color layer PA. For example, the color of the color layer PA may be black, gray, pink, gold, silver, red, blue, or white. According to an embodiment of the inventive concept, as the brightness of the color layer PA is higher, the thickness of the color layer PA may become greater (e.g., larger). For example, when the color of the color layer PA is white, the thickness of the color layer PA may become larger than the case where the color layer PA has another color. According to embodiments of the inventive concept, because the adhesive layer RS does not cover the color layer PA, a phenomenon that air bubbles may be generated by the uneven color layer may be prevented. Accordingly, the display device DD (see FIG. 1) may have improved reliability and quality.

The shield layer PB may be disposed under the color layer PA. The shield layer PB may be at least one-layered color layer. The shield layer PB may be a light blocking tape. The shield layer PB is typically black, but is not limited thereto, and may have various other suitable colors. The shield layer PB may block passing of incident light. For example, the shield layer PB may absorb or reflect light. The width W1 in the first direction DR1 of the shield layer PB may be smaller than the width W2 in the first direction DR1 of the second sub-color layer PAb. The color layer PA and the shield layer PB may be provided through a deposition, printing, or coating process.

The adhesive layer RS may be disposed under the window layer WM. For example, the adhesive layer RS may be disposed under the transmission area TA. The adhesive layer RS may not cover the color layer PA. In a direction perpendicular to the display panel (e.g., on a plane), the color layer PA and the adhesive layer RS may not overlap each other.

The display module DM may be disposed under the adhesive layer RS. The display module DM may be divided into a display area DA and a non-display area NDA around (e.g., configured to surround) the display area DA. The non-display area NDA may be adjacent to the display area DA. The non-display area NDA may be around (e.g., surrounding) the display area DA.

The display area DA of the display module DM may correspond to the display area P-DA of the display panel DP (see FIG. 3), and the non-display area NDA of the display module DM may correspond to the non-display area P-NDA of the display panel DP (see FIG. 3).

In a direction perpendicular to transmission area TA (e.g., on a plane in the third direction DR3), the display area DA may overlap the adhesive layer RS. The width in the first direction DR1 of the adhesive layer RS may be the same as that in the first direction DR1 of the display area DA. The non-display area NDA may overlap the color layer PA. The distance TH in the first direction DR1 between the display area DA and the color layer PA may have a width of 0.3 mm or greater.

In relation to FIG. 5B, the display area DA may have the shape in which a part corresponding to a corner (e.g., an apex) of the quadrangle has a curvature. However, this is just an example, and the display area DA may have various shapes and is not limited to any one embodiment. The shape of the display area DA may be the same as that of the adhesive layer RS. For example, the adhesive layer RS may have the shape in which a part corresponding to a corner (e.g., a corner) of the quadrangle has a curvature.

The boundary DM-B between the display area DA and the non-display area NDA may overlap an exterior boundary RS-B of the adhesive layer RS. The boundary DM-B may be the same as the boundary between the display area P-DA (see FIG. 3) and the non-display area P-NDA of the display panel DP (see FIG. 3).

Figure 6A:
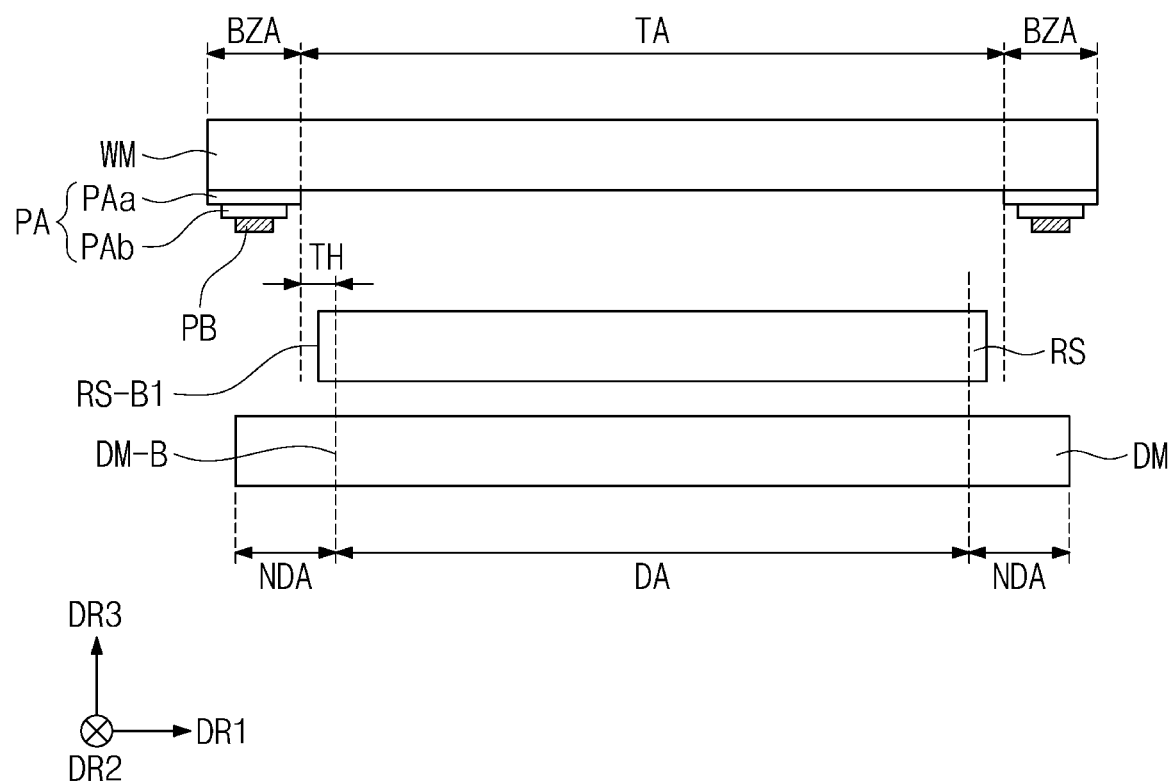
FIG. 6A is an exploded cross-sectional view of a display module according to an embodiment of the inventive concept.
Figure 6B:
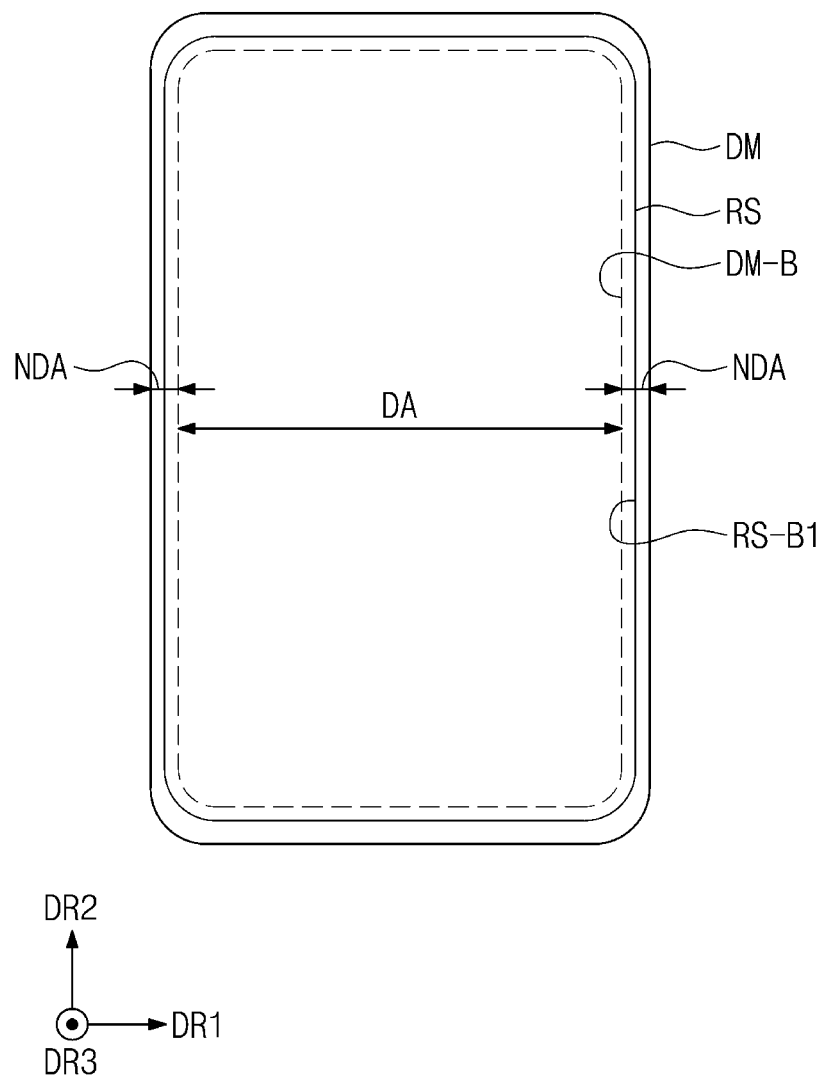
FIG. 6B is a plan view of a part of a display module according to an embodiment of the inventive concept.

FIG. 6A is an exploded cross-sectional view of a display module according to an embodiment of the inventive concept, and FIG. 6B is a plan view of a part of a display module according to an embodiment of the inventive concept. Like reference numerals are given to the elements described in relation to FIGS. 3A and 3B, and descriptions thereabout may be omitted.

In relation to FIGS. 6A and 6B, the width in the first direction DR1 of the adhesive layer RS may be larger than that in the first direction DR1 of the display area DA, and smaller than that in the first direction DR1 of the transmission area TA. On a plane (e.g., in a direction perpendicular to the transmission area such as the third direction DR3), a part of the adhesive layer RS may overlap the non-display area NDA. On a plane (e.g., in a direction perpendicular to the transmission area such as the third direction DR3), the boundary DM-B between the display area DA and the non-display area NDA may be around (e.g., surrounding) the exterior boundary RS-B of the adhesive layer RS.

Figure 7:
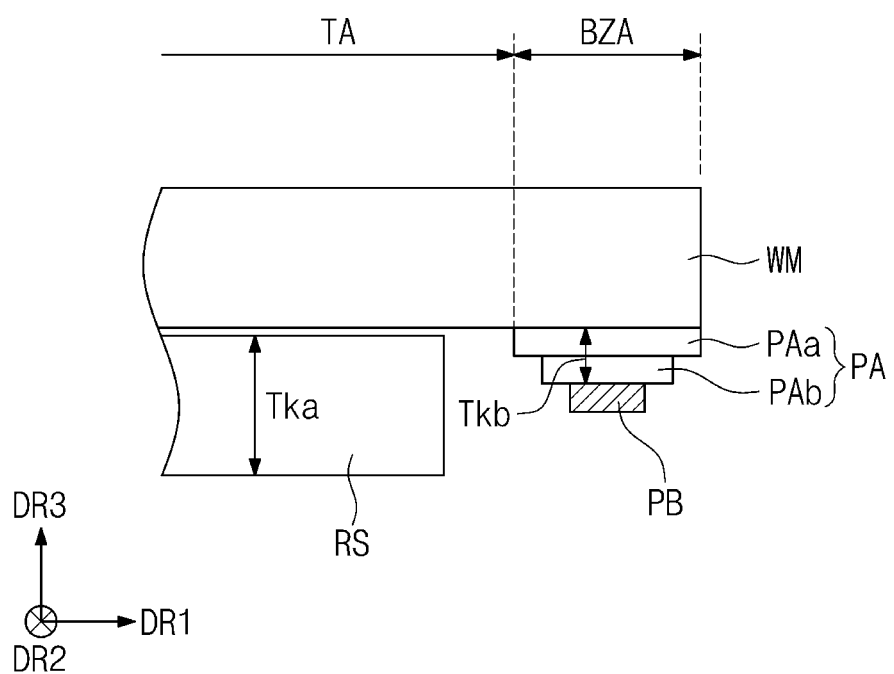
FIG. 7 is a cross-sectional view of a part of a display module according to an embodiment of the inventive concept.

FIG. 7 is a cross-sectional view of a part of a display module according to an embodiment of the inventive concept. Like reference numerals are given to the elements described in relation to FIGS. 1 to 6A and 6B, and descriptions thereabout may be omitted.

In relation to FIG. 7, the thickness Tka of the adhesive layer RS may be larger than the thickness Tkb of the color layer PA. The color layer PA may be separated from the adhesive layer RS. (e.g., in a direction perpendicular to the transmission area such as the third direction DR3), the color layer PA may be around (e.g., surrounding) the adhesive layer RS.

The color layer PA may include a plurality of sub-color layers PAa and PAb. For example, when the color of the bezel area BZA is black, the plurality of sub-color layers may include at least two sub-layers. When the color of the bezel area BZA is white, the plurality of sub-color layers may include at least five sub-layers. However, these are just examples, and the plurality of sub-color layers may include various numbers of sub-color layers according to the color of the bezel area BZA.

According to an embodiment of the inventive concept, the adhesive layer RS does not cover the color layer PA. Accordingly, when the thickness Tkb of the color layer PA becomes larger, a phenomenon where air bubbles are generated between the color layer PA and the adhesive layer RS by the uneven color layer PA may be prevented or reduced. Accordingly, the display device DD (see FIG. 1) may have an improved reliability.

According to the embodiments of the inventive concept, the display device may include a color layer and an adhesive layer. The color layer and the adhesive layer may not overlap on a plane (e.g., in a direction perpendicular to the transmission area such as the third direction DR3). The thickness of the color layer may be increased according to a color desired to implement. The adhesive layer does not cover the color layer. When the adhesive layer covers the color layer, air bubbles may be generated by the resulting uneven color layer. However, according to the embodiments of the inventive concept, because the adhesive layer does not cover the color layer, a phenomenon that the air bubble is generated by the uneven color layer may be prevented or reduced. Accordingly, the display device having improved reliability may be provided.

While this invention has been described with reference to exemplary embodiments thereof, it will be clear to those of ordinary skill in the art to which the invention pertains that various changes and modifications may be made to the described embodiments without departing from the spirit and technical area of the invention as defined in the appended claims and their equivalents. Thus, the scope of the inventive concept shall not be restricted or limited by the foregoing description, but be determined by the broadest reasonable interpretation of the following claims and their equivalents.

What is claimed is:
1. A display device comprising:
a window layer;
a color layer under the window layer and visible from an upper side of the window layer;
an adhesive layer under the window layer; and
a display panel under the adhesive layer and comprising a display area and a non-display area adjacent to the display area,
wherein, in a plan view, a shape of the adhesive layer corresponds to that of the display area,
wherein the color layer comprises:
a first sub-color layer under the window layer; and a second sub-color layer under the first sub-color layer,
wherein a width of the first sub-color layer is greater than that of the second sub-color layer, and
wherein the display panel overlaps the first sub-color layer and the second sub-color layer in the plan view.

2. The display device comprising:
a window layer;
a color layer under the window layer;
an adhesive layer under the window layer; and
a display panel under the adhesive layer and comprising a display area defined as an area on which an image is displayed, a non-display area adjacent to the display area and defined as an area on which an image is not displayed, and a boundary separating the display area and the non-display area,
wherein, in a plan view, a shape of the adhesive layer corresponds to that of the display area,
wherein, in the plan view, the adhesive layer is entirely within the boundary separating the display area and the non-display area,
wherein, the the plan view, the color layer is entirely spaced apart from an outermost perimeter edge of the adhesive layer,
wherein the color layer comprises:
a first sub-color layer under the window layer; and
a second sub-color layer under the first sub-color layer, wherein a width of the first sub-color layer is greater than that of the second sub-color layer, and
wherein the display panel overlaps the first sub-color layer and the second sub-color layer in the plan view.

3. The display device of claim 1, wherein, in the plan view, an exterior boundary of the adhesive layer is around a boundary between the display area and the non-display area.

4. The display device of claim 1, wherein in the lateral direction, the color layer is separated apart from the display area by 0.3 mm or greater.

5. The display device of claim 1, wherein the color layer comprises a plurality of sub-color layers.

6. The display device of claim 1, further comprising:
a shield layer under the color layer.

7. The display device of claim 1, wherein, in the plan view, in the shape of the adhesive layer, a part corresponding to a corner of a quadrangle has a curvature.

* * * * *